United States Patent [19]

Choby et al.

[11] Patent Number: 5,236,650
[45] Date of Patent: Aug. 17, 1993

[54] METHOD OF RIM BONDING URETHANE GASKETS TO AUTOMOTIVE GLAZING SHEETS

[75] Inventors: David A. Choby, Elkhart, Ind.; Peter J. Kubizne, Newark, Del.

[73] Assignee: Excel Industries, Inc., Elkhart, Ind.

[21] Appl. No.: 811,630

[22] Filed: Dec. 23, 1991

[51] Int. Cl.$^5$ .............................................. B29C 45/14
[52] U.S. Cl. .................................. 264/135; 264/240; 264/252; 427/377
[58] Field of Search ................. 427/377; 264/135, 240, 264/252, 340, 245, 246, 247, 234; 156/329

[56] References Cited

U.S. PATENT DOCUMENTS

| 4,015,044 | 3/1977 | Ranney et al. | 156/329 |
| 4,015,047 | 3/1977 | Ranney et al. | 427/407.1 |
| 4,687,533 | 8/1987 | Rizk et al. | 156/329 |
| 4,761,916 | 8/1988 | Sanok et al. | 49/381 |
| 4,839,122 | 6/1989 | Weaver | 264/135 |
| 5,008,062 | 4/1991 | Anderson et al. | 264/252 |

FOREIGN PATENT DOCUMENTS 63-15716  1/1988  Japan ................................... 264/135

Primary Examiner—Jay H. Woo
Assistant Examiner—Robert B. Davis
Attorney, Agent, or Firm—Thomas J. Dodd

[57] ABSTRACT

A process for RIM bonding urethane gaskets to glass panels which includes storing a primed glass panel in a temperature-humidity controlled environment for 20-28 hours. The primed and conditioned panels are then fitted with RIM gaskets with 24 hours after removal from the controlled environment.

1 Claim, 1 Drawing Sheet

METHOD OF RIM BONDING URETHANE GASKETS TO AUTOMOTIVE GLAZING SHEETS

FIELD OF THE INVENTION

This invention relates to improvements in a RIM Bonding process.

BACKGROUND OF THE INVENTION

Modular automotive windows produced by molding a plastic gasket directly around a piece of glass have been in commercial use since the late 1970's. Often the molded gasket can include attachment means and/or decorative trim made of plastic or metal. The first of these modular windows were produced by injection molding polyvinyl chloride directly onto the peripheral edges of the glass. Additionally, modular windows incorporating urethane gaskets molded directly on the edges of the glass using the reaction injection molding (RIM) process have seen increased usage in vehicle applications since their introduction in the mid-1980's.

All of the commercial applications to date utilize urethane or polyvinyl chloride applied to three surfaces (front, rear and side edges) of the glass for at least a portion of the total periphery of the glass. Automotive stylists continue to demand completely uninterrupted flush surfaces between the glass and sheet metal. These styling demands can be best met by molding a gasket of either polyvinyl chloride or urethane to either the back side of the glass only or to the back side and edge of the glass only.

Current commercial applications of modular windows retain the glass to the vehicle by the bond of the gasket to the glass and by physical part geometry of the gasket. With a gasket formed on three surfaces of the glass and extending around the periphery of the glass, glass retention to the vehicle could be obtained even without a bond between the glass and gasket. In fact, rear window glass of pick-up trucks have been retained in the vehicles by a separately constructed EPDM gasket that is first assembled to the glass and then assembled to the vehicle window opening without any bonding between the gasket and the glass. When properly designed, this type of installation without any bonding provides a leak free system with adequate retention of the glass to the vehicle.

However, the elimination of gasket material from the outside surface of the glass, which is required for flush installations, makes it necessary to provide other means of retaining the glass to the vehicle. One method of obtaining this retention is to form a structural adhesive bond between the glass and the vehicle sheet metal. This method has been used with many commercial applications of windshields and quarter windows. This method can be very expensive for the vehicle manufacturer since the adhesive is usually dispensed by a robot and the glass and sheet metal must each be coated with a primer or primers to promote a structural bond.

A more preferred method, especially for quarter windows, is to provide attachment and location means embedded in the window gasket such as tee studs. A sealant material such as a foam impregnated with tacky butyl rubber can be assembled to the modular window gasket by the window manufacturer providing the vehicle assembler with a low cost modular window installation. In this case, with the elimination of the gasket on the outside surface of the glass, and with the gasket mechanically attached to the vehicle, it is necessary to rely on the glass to gasket bond for complete glass retention. Failure of this bond could result in water leakage, wind noise, and possibly the separation of glass from the vehicle.

Experience with various methods of modular window manufacture focused the development efforts of this gasket to glass bond on the use of Reaction Injected Molded (RIM) urethane in conjunction with a silane based priming agent. It was felt that this technology could be developed to satisfy the bond characteristics required for flush modular windows when the gasket is only on the back side or on the backside and side edge of the glass. Urethane and silane chemistries have been used for many years as a bonding method for glass in automotive applications. Current commercial modular windows with RIM urethane gaskets use silane materials for bonding the gasket to the glass.

A description of the use of one of these types of glass priming agents is contained in U.S. Pat. No. 4,839,122. This patent describes a priming method utilizing priming agents called "Beta-seal, Glass Primer 435.18 and Beta-seal Glass Primer 435.20 produced by Essex Chemical Company. The priming method outlined in the above mentioned patent corresponds to the instructions for use provided by the manufacturer of the "Beta-Seal" material. The "Beta-seal Glass Primer 435.18" is first wiped on the edges of the glass where bonding to the gasket is required. The first primer is then coated with a second primer, "Beta-seal Glass Primer 435.20". The method then describes a waiting period of approximately twenty minutes after which the primed glass can be placed in a mold where the urethane gasket is formed directly onto the glass over the primed areas.

U.S. Pat. No. 4,761,916 describes another priming method for modular windows utilizing RIM urethane gaskets. This method uses a different "Beta-seal Glass Primer" also produced by Essex Chemical Company and designated as "Beta-seal Glass Primer 435.21". This method uses a single coat of the primer on the glass which is allowed to air dry for a minimum of two to three minutes and that the gasket must be molded onto the glass using the RIM process within thirty minutes of primer application.

SUMMARY OF THE INVENTION

The present invention relates to a method for producing a stable, durable bond between the glass and gasket for flush modular window applications where the aforementioned bond is the sole or primary means of glass retention to the vehicle.

Testing has indicated that the bond strengths formed between the gasket and the glass will vary greatly when the primer is processed in a manner similar to those described in U.S. Pat. Nos. 4,761,916 or 4,839,122 or if the primers are processed in a manner as recommended by the primer manufacturer. A glass to gasket bond whose strength varies greatly would not be desirable for a modular window that depends solely on the glass to gasket bond for glass retention.

Following these principles, the method of this invention involves the application of a silane type primer to the glass edge. The primed glass is then stored in an area which is kept under strict humidity and temperature control for between 20 and 28 hours. The glass is then processed by RIM shortly after its removal from the storage area.

Accordingly, it is an object of this invention to provide a novel and improved process of fabricating modular windows.

Another object of this invention is to provide a window fabrication process which insures uniformity of the primed window glass surface throughout a lot.

Another object is to provide a method of fabrication for modular windows which reduces the number of windows which must be refabricated due to inferior processing methods.

Others objects will become apparent upon a reading of the following description.

DESCRIPTION OF THE PREFERRED EMBODIMENT

Figure 1:
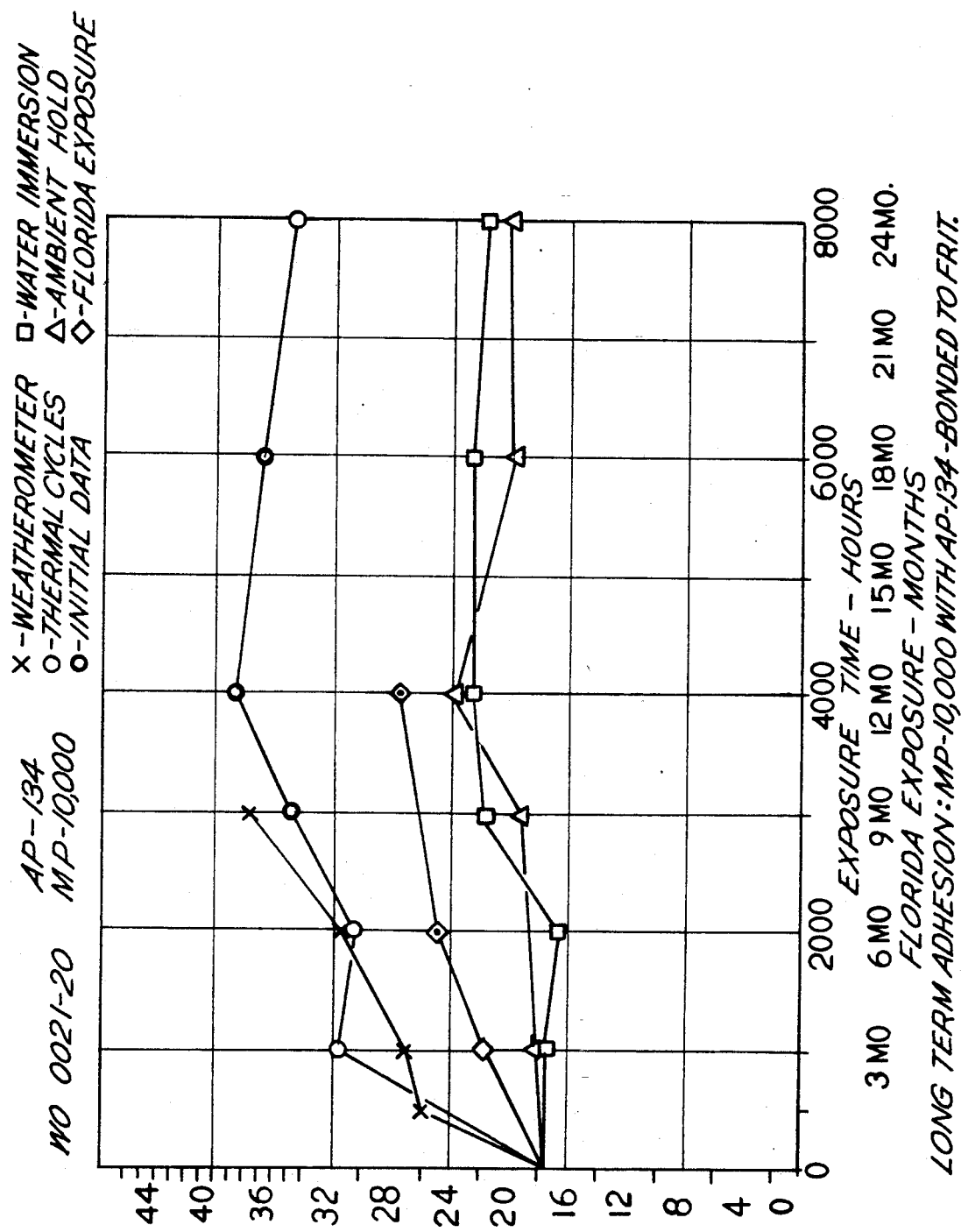
FIG. 1 is a graphical representation of performance characteristics of glass treated by the method of this invention.

Before describing the method of producing a reliably strong bond between the glass and gasket, which is the present invention, it is necessary to give a brief description of how a silane type primer produces a bond. The silane primer molecules have reactive chemical groups on each end of a carbon chain. One end of the molecule has groups which can form bonds with the hydroxyl groups on the surface of the glass. The result of this reaction is a stable chemical bond between silicon and oxygen atoms. The other end of the molecule has groups that will react with the isocyanates of the multi-constituent urethane formulation during the actual RIM process. Again, stable chemical bonds are formed.

Extensive testing has shown that the bond between the silane primer and the urethane gasket is repeatedly formed with little variation in bond strength so long as the RIM process is kept within normal process limits. Normal process limits are known to those who practice the art of RIM. The bond strength of the silane primer to the hydroxyl groups on the glass surface however can vary greatly depending on the priming conditions and the priming process. The reaction of the primer to the hydroxyl groups requires free $H_2O$ to be available to act as a catalyst to drive the reaction. Thus this reaction can be sensitive to relative humidity, time and temperature.

There are other factors which can also affect the strength of the primer to the glass bond. One of these is the lot to lot variation of the primer itself and the slight variations of the constituents used to form the urethane gasket. It was the purpose of this development to define a method that would produce a stable durable bond that would be robust against the lot-to-lot variations of the primer and urethane constituents and also be robust against any variations in the molding process and ambient mold environmental conditions.

The criteria that was established was to have three sigma capability of a bond strength of ten pounds per linear inch when tested per a 180° peel test as described in the Ford Motor Company's specification ESB-M11P31-A. Also this initial bond strength must be stable and not degrade with time when samples are subjected to long term environmental exposures.

The methods described previously in the aforementioned patents and the methods described in literature provided by the silane manufacturers do not specifically define a method of insuring that adequate $H_2O$ is present for sufficient time to act as a catalyst for the bonding reaction between the primer and the glass.

The method of this invention will define a curing process for the silane primer once it is applied to the glass which will insure that adequate $H_2O$ is available for sufficient time to catalyze the reaction of the primer to the glass resulting in a very repeatable stable bond.

The development testing was done using silane primers produced by Lord Corporation and designated as Chemlok AP-134 and Chemlok AP-144. These primers are identical except that AP-144 contains an agent which is visible under a black light. This makes it very easy to check that the primer has been applied to the glass in the proper areas preferred wet primer thicknesses between 0.001 and 0.002 inches. The urethane materials used in this development were MP-10,000 and MP-10,000 with internal mold release. Both of these materials are supplied by Mobay Chemical Corporation. The glass used in this investigation was tempered glass with ceramic frit provided by Ford Glass Division. The results of this investigation and the method of this invention discloses the use of Chemlok AP-134 and Chemlok AP-144 and to the Mobay MP family of urethane materials, but other equivalent chemicals may also be used with equal results.

During the development testing, 1,296 peel strength tests were run on samples of urethane molded directly to glass by the RIM process. Various levels of cure temperature between 20° C. and 38° C. and cure humidity between 75% and 85% were evaluated as were various lengths of primer cure times normally 20–28 hours at a minimum gap between glass sheets of six millimeters. A total of six different lots of primer were also evaluated. The investigation showed the desired bond strength with three sigma capability was only obtained when primed glass was cured for twenty-four hours at a relative humidity of approximately eighty percent.

The next step in the development was to show the long term stability of the gasket to glass bond after extended environmental exposure. Four environmental conditions were chosen and are defined as follows:

1. Water Soak-Sample totally submerged in deionized water at 22+/−2 C.
2. Florida Exposure-5° south-direct weathering inland.
3. Thermal/Humidity Cycle-4 hours at 88+/−1 C., 4 hours at 38+/−2 C. and 95–100% relative humidity, 16 hours at −29+/−2 C. Weekends and holidays at −29+/−2 C.
4. Xenon Weatherometer-Per SAE J1960

A group of test samples were also held at ambient conditions for control purposes. Again, test results were obtained using methods described in Ford Motor Company's Specification ESB-M11P31-A.

Typical test results of gasket to glass bond strength are shown in FIG. 1. The data shows there was no degradation in bond strength due to the environmental exposures. There was an increase in bond strength after the thermal/humidity and the weatherometer exposure and to a lesser extent after Florida aging while the bond strength remained fairly constant for the ambient hold samples and for the water immersion samples. This would indicate that heat input to the samples has the effect of increasing the bond strength. This was later confirmed by post curing test samples at 120 C. for one hour and comparing this bond strength to samples that were not post cured. The data showed the post cured samples to have a bond strength 40-60% higher than the samples that were not post cured. Also it was found that different combinations of time and temperature could trigger the increase in bond strength.

All of the testing was done on glass samples as received from the glass manufacturer. None of the glass was cleaned prior to its use in this investigation. Clean glass can consistently be received from the glass manufacturer if proper attention is paid to the glass manufacturing process and the method of packaging the glass for shipment. The glass manufacturing process must be set up such that no contaminants are permitted on the glass surface during fabrication. Also the packaging materials must be specified such that they will not transfer a contaminant to the glass surface. Some glass manufacturers use an oil impregnated recycled paper as an interleaf between sheets of glass for shipping. This type of paper can transfer the oil to the glass and have an adverse effect on bond strength.

Also, all the bonds tested were on the ceramic frit area of the glass. The ceramic frit acted effectively as a shield against penetration to the bonded surface by ultra violet light. The high degree of effectiveness can be seen by again referring to FIG. 1 and reviewing the results for weatherometer exposure and Florida exposure.

We claim:

1. A method for producing a repeatable and stable bond between a reaction injection molded urethane gasket and a ceramic fritted portion of an automotive glass glazing sheet in a modular window, said method comprising the steps of:
 a) providing a fritted glass sheet which is clean and substantially free of surface contamination,
 b) applying a silane primer of a wet primer thickness of about 0.001 inches to 0.002 inches onto the areas of the glass sheet wherein a bond between the gasket and sheet is desired,
 c) treating the fritted glass sheet after priming in a humidity controlled area at a relative humidity of 75% to 85% and a temperature of 20° C.-38° C. for a period of 20 hours to 28 hours wherein said fritted glass sheets are stored with a minimum gap of 6 millimeters between adjacent sheets, and
 d) forming a gasket on said fritted glass sheet in the area of primer application by reaction injection molding using a urethane compound within 24 hours of removal from said humidity controlled area.

* * * * *